United States Patent
Lin (10) Patent No.: US 9,545,998 B2
(45) Date of Patent: Jan. 17, 2017

(54) BUNK ASSEMBLY AND METHOD OF MANUFACTURING THEREOF

(71) Applicant: The Boeing Company, Huntington Beach, CA (US)

(72) Inventor: Christopher Lin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 14/465,095

(22) Filed: Aug. 21, 2014

(65) Prior Publication Data

US 2016/0052631 A1    Feb. 25, 2016

(51) Int. Cl.
*B64D 11/00*    (2006.01)

(52) U.S. Cl.
CPC ....... *B64D 11/00* (2013.01); *B64D 2011/0076* (2013.01); *Y02T 50/46* (2013.01)

(58) Field of Classification Search
CPC ............. B64D 11/00; B64D 2011/0069; B64D 2011/0076; B64D 2011/0084; A47B 83/00; A47C 19/20
See application file for complete search history.

(56) References Cited

U.S. PATENT DOCUMENTS

| | | | | |
|---|---|---|---|---|
| 5,716,026 A | * | 2/1998 | Pascasio | B64D 11/00 105/315 |
| 6,003,813 A | * | 12/1999 | Wentland | B64D 11/00 244/118.5 |

FOREIGN PATENT DOCUMENTS

EP    1010617 B1    3/2005

OTHER PUBLICATIONS

France Office Action for related application 15 57255 dated Jan. 4, 2016; 3 pp.

* cited by examiner

*Primary Examiner* — Christopher P Ellis
*Assistant Examiner* — Jessica Wong
(74) *Attorney, Agent, or Firm* — Armstrong Teasdale LLP (57) ABSTRACT

A bunk assembly is provided. The bunk assembly includes a first plurality of bunks including a first bunk and a second bunk coupled end-to-end with the first bunk. The first and second bunks each include a cutout that substantially align forming a bunk slot between the first and second bunks when coupled end-to-end. The first plurality of bunks also includes a third bunk stacked on top of the first and second bunks when positioned in the bunk slot.

18 Claims, 6 Drawing Sheets

BUNK ASSEMBLY AND METHOD OF MANUFACTURING THEREOF

BACKGROUND

The field of the present disclosure relates generally to bunk assemblies and, more specifically, a space-saving arrangement of bunks in bunk assemblies.

At least some known long range, subsonic airliners are utilized on routes that are non-stop and that have a duration of twelve hours or longer. For such flights, federal regulations require crew rest accommodations to be provided for pilots and flight attendants of the aircraft. However, space in an aircraft fuselage is limited, and available space is generally allocated to increase passenger capacity and to improve passenger comfort and amenities. As such, at least some crew rest accommodations are positioned above the passenger cabin and are accessible via a stairway, ladder, or other similar device.

In one configuration, the crew rest accommodations include bunks arranged end-to-end extending along a length of the aircraft fuselage on either side of an aisle. In another configuration, the bunks are stacked on top of each other and arranged end-to-end along the length of the aircraft fuselage. However, such configurations generally increase the weight of the aircraft and/or obtrusively protrude into the passenger cabin, thereby reducing passenger comfort and amenities such as overhead storage space.

BRIEF DESCRIPTION

In one aspect, a bunk assembly is provided. The bunk assembly includes a first plurality of bunks including a first bunk and a second bunk coupled end-to-end with the first bunk. The first and second bunks each include a cutout that substantially align forming a bunk slot between the first and second bunks when coupled end-to-end. The first plurality of bunks also includes a third bunk stacked on top of the first and second bunks when positioned in the bunk slot.

In another aspect, an aircraft assembly is provided. The aircraft assembly includes a fuselage including a passenger cabin and a bunk assembly within the passenger cabin. The bunk assembly includes a first plurality of bunks including a first bunk and a second bunk coupled end-to-end with the first bunk. The first and second bunks each include a cutout that substantially align forming a bunk slot between the first and second bunks when coupled end-to-end. The first plurality of bunks also includes a third bunk stacked on top of the first and second bunks when positioned in the bunk slot.

In yet another aspect, a method of manufacturing a bunk assembly is provided. The method includes coupling a first bunk end-to-end with a second bunk, wherein the first and second bunks each include a cutout that substantially align forming a bunk slot between the first and second bunks. The method also includes positioning a third bunk in the bunk slot such that the third bunk is stacked on top of the first and second bunks.

DETAILED DESCRIPTION

The implementations described herein relate to bunk assemblies and methods of manufacturing thereof The bunk assemblies include a plurality of bunks in a staggered arrangement such that at least some of the bunks are stacked on top of other bunks in the assembly. For example, in one implementation, two bunks are coupled together end-to-end and the bunks each include a cutout that substantially align forming a bunk slot therebetween. The cutout in each bunk defines an upper section and a lower section such that the bunk has an L-shape configuration, and a third bunk is stacked on top of the lower sections of each bunk when positioned in the bunk slot. This staggered arrangement facilitates reducing a length of the bunk assembly extending along a length of a passenger compartment of an aircraft, for example, while providing similar crew rest accommodation capacity when compared to a single stacked end-to-end bunk configuration. Reducing the length of the bunk assembly also reduces the weight of the aircraft by reducing a length of a bunk assembly support structure extending along the length of the passenger compartment.

Moreover, the lower section of the L-shaped bunks is designed to accommodate an occupant's lower body such that a height of the lower section can be reduced without reducing a comfort level of the occupant. Reducing the height of the lower sections of the L-shaped bunks reduces a distance that the bunk assembly protrudes into the passenger compartment when compared to a double stacked bunk configuration. Although the height of the lower sections is reduced, an overall height of the L-shaped bunks is increased providing an ability of an occupant to sit upright within the bunk. As such, a number of in-flight seats provided in a vestibule area of the bunk assembly can be reduced or eliminated, thereby providing additional weight and/or cost savings. In some implementations, pluralities of bunks in the staggered arrangement are positioned on either side of an aisle, and at least one bunk extends transversely relative to the aisle to couple to bunks on either side of the aisle. As such, the bunk configurations described herein facilitate reducing an overall volume of the bunk assembly to less than about 550 cubic feet, thereby increasing the size of the passenger compartment and its ability to provide improved passenger comfort and amenities.

Figure 1:
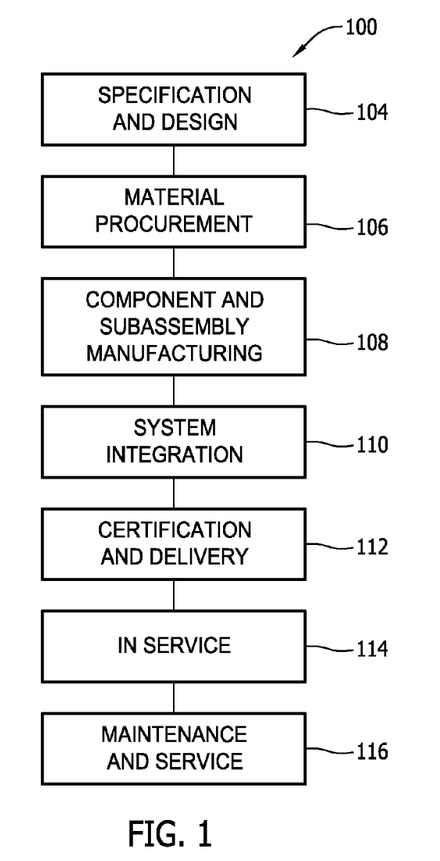
FIG. 1 is a flow diagram of an exemplary aircraft production and service method.
Figure 2:
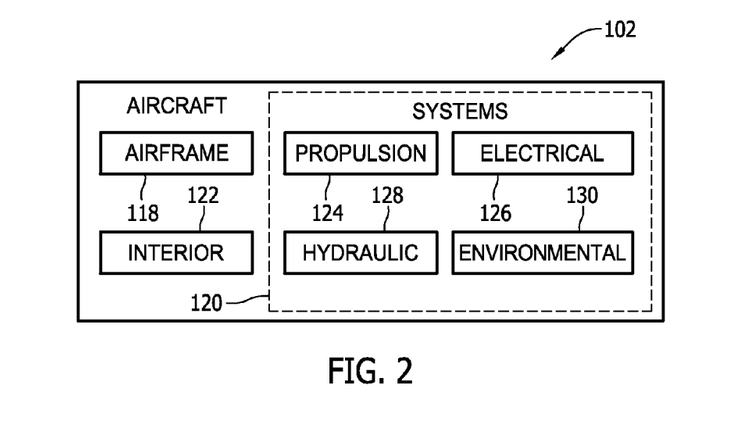
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
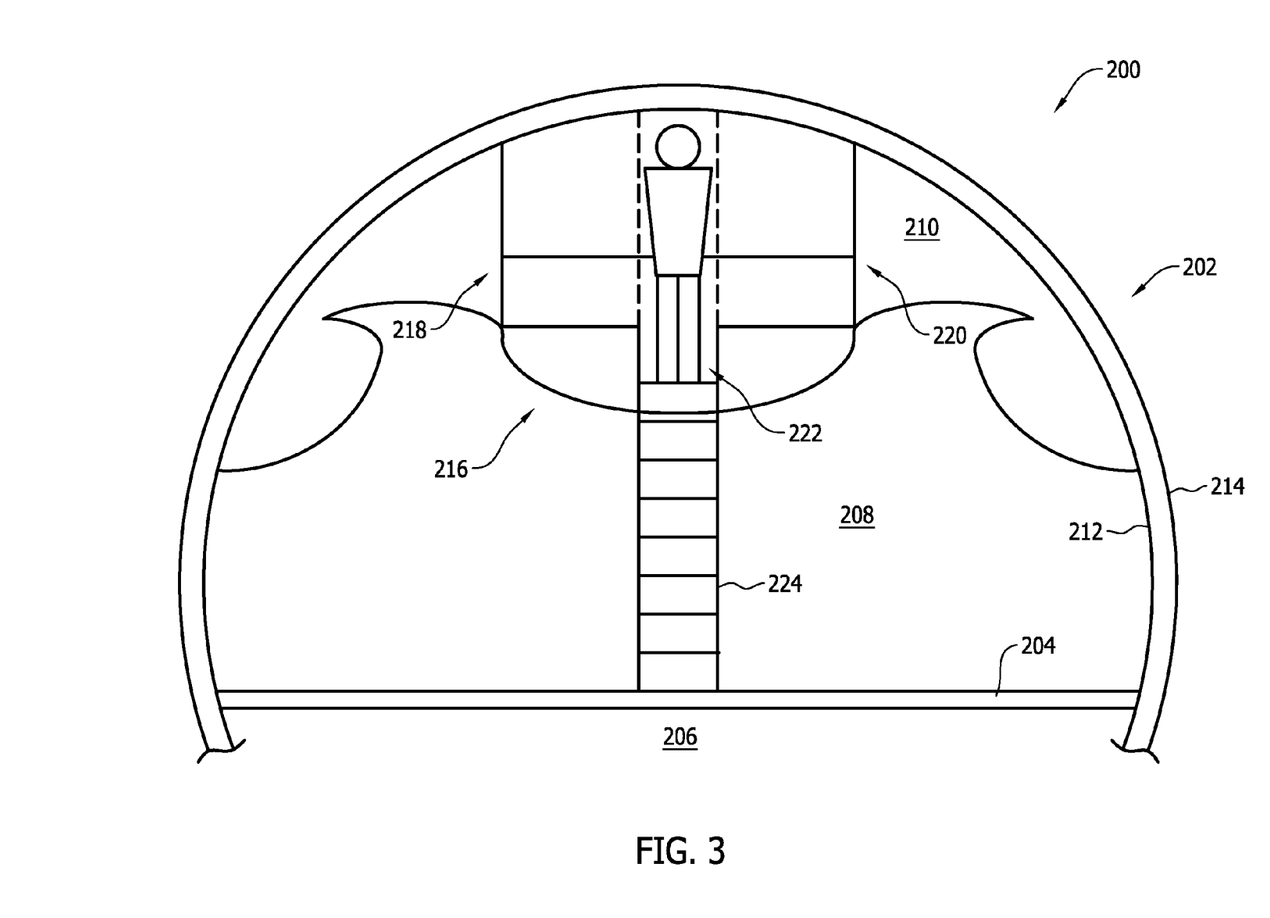
FIG. 3 is a cross-sectional illustration of an exemplary aircraft fuselage.

FIG. 3 is a cross-sectional illustration of an exemplary aircraft fuselage 200. In the exemplary implementation, aircraft fuselage 200 includes an upper lobe 202 located above a floor beam 204, and a lower lobe 206 located below floor beam 204. Upper lobe 202 includes a passenger cabin 208 and a crown 210, and lower lobe 206 includes cargo space and essential equipment, such as a bilge and electrical systems (not shown). Aircraft fuselage 200 also includes a passenger cabin side wall 212 and an outer skin 214 that defines an external boundary (not shown) of aircraft fuselage 200. Moreover, an overhead bunk assembly 216 is located in crown 210 and extends towards passenger cabin 208. Overhead bunk assembly 216 includes a first plurality 218 of bunks and a second plurality 220 of bunks extending substantially parallel with first plurality 218 of bunks. First and second pluralities 218 and 220 of bunks are located on either side of an aisle 222, and aisle 222 is accessible to the crew of aircraft 102 via stairs 224. Alternatively, stairs 224 may lead to a vestibule (not shown), which provides access to aisle 222. Moreover, in an alternative implementation, bunk assembly 216 may be utilized in any structure and/or vehicle other than aircraft that can benefit from the space-saving arrangements described herein.

Figure 4:
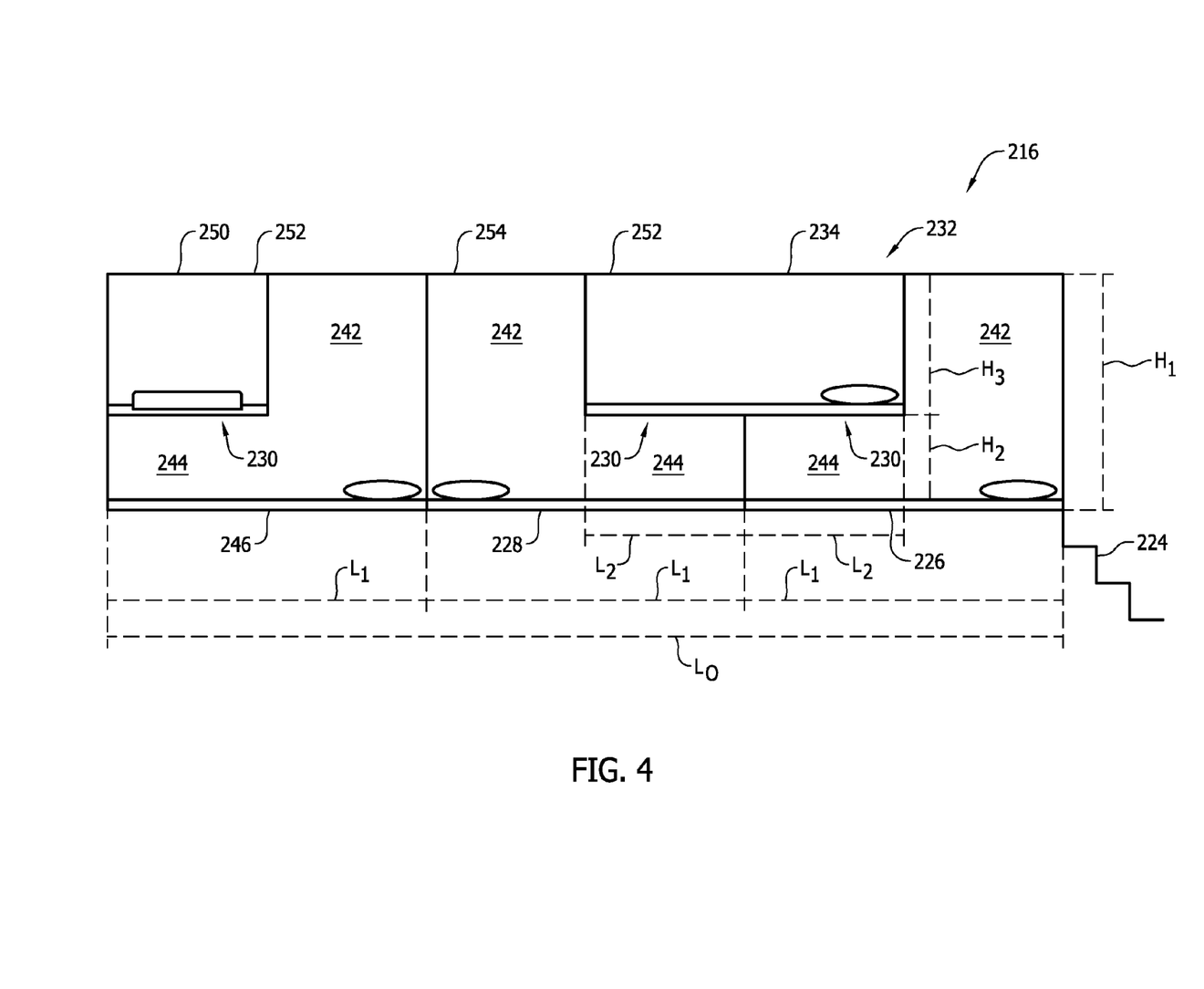
FIG. 4 is a schematic side view illustration of an exemplary overhead bunk assembly that may be used with the aircraft fuselage shown in FIG. 3.
Figure 5:
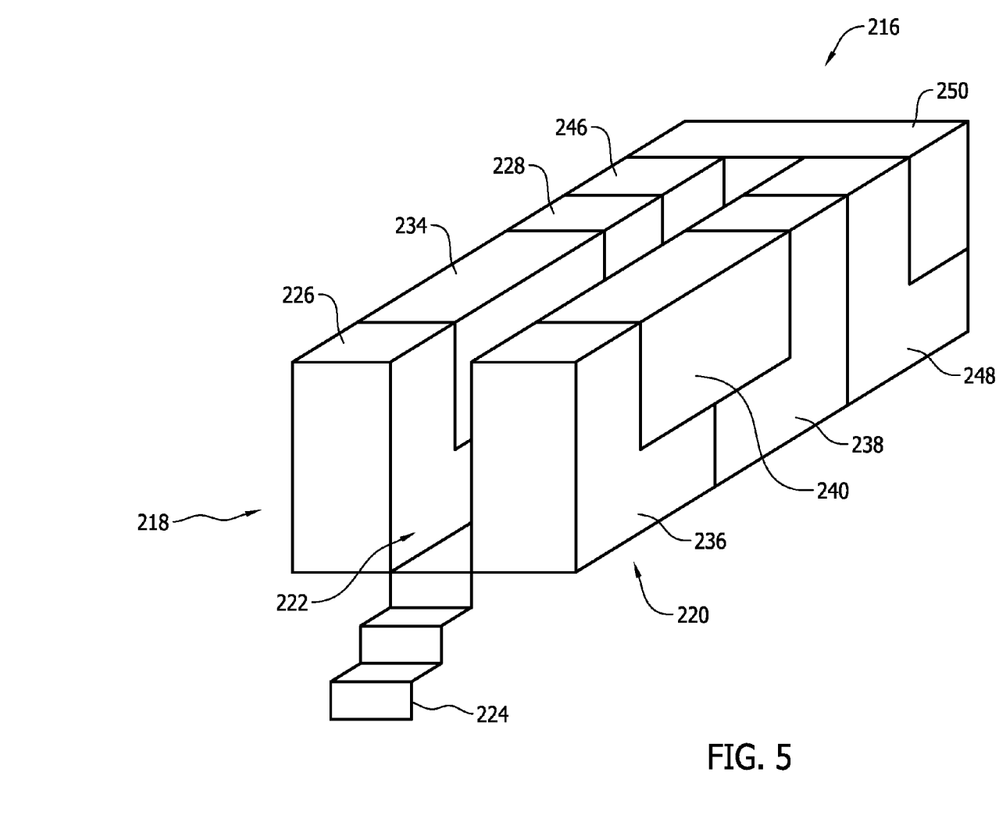
FIG. 5 is a perspective illustration of the overhead bunk assembly shown in FIG. 4.

FIG. 4 is a schematic side view illustration of an exemplary overhead bunk assembly 216 that may be used with aircraft fuselage 200 (shown in FIG. 3), and FIG. 5 is a perspective illustration of overhead bunk assembly 216. In the exemplary implementation, overhead bunk assembly 216 is designed to provide nine bunks for the crew of aircraft 102. Specifically, first plurality 218 of bunks includes a first bunk 226, and a second bunk 228 coupled end-to-end with first bunk 226. Each of first and second bunks 226 and 228 include a cutout 230 that substantially align forming a bunk slot 232 between bunks 226 and 228 when coupled-end-to-end. A third bunk 234 has a substantially rectangular shape and is sized for insertion within bunk slot 232. Third bunk 234 is stacked on top of first and second bunks 226 and 228 when positioned in bunk slot 232. Moreover, second plurality 220 of bunks includes a fourth bunk 236, a fifth bunk 238, and a sixth bunk 240. Each of bunks 236-240 are substantially similarly arranged as bunks 226, 228, and 234, and are positioned on an opposing side of aisle 222. As such, descriptions of bunks 226, 228, and 234 are likewise applicable to bunks 236-240.

In the exemplary implementation, cutouts 230 define an upper section 242 and a lower section 244 in each of first and second bunks 226 and 228. When coupled end-to-end, lower sections 244 of first and second bunks 226 and 228 are positioned adjacent to each other such that bunk slot 232 is formed therebetween. As such, third bunk 234 can be stacked on top of lower sections 244 of bunks 226 and 228. Moreover, overhead bunk assembly 216 includes a seventh bunk 246 coupled end-to-end with second bunk 228 of first plurality 218 of bunks, an eighth bunk 248 coupled end-to-end with fifth bunk 238 of second plurality 220 of bunks, and a ninth bunk 250 coupled to bunks 246 and 248 and extending transversely relative to aisle 222. Each of seventh and eighth bunks 246 and 248 also include a cutout 230 such that upper and lower sections 242 and 244 are defined thereby. As such, when coupled end-to-end, upper sections 242 of seventh and eighth bunks 246 and 248 are positioned adjacent to upper sections 242 of second and fifth bunks 228 and 238, respectively. Moreover, cutouts 230 have a cross-sectional shape substantially similar to a cross-sectional shape of ninth bunk 250. Cutouts 230 enable ninth bunk 250 to be stacked on top of lower sections 244 of bunks 246 and 248 when ninth bunk 250 extends transversely relative to aisle 222.

Referring to FIG. 4, upper sections 242 have a height $H_1$ that enables an occupant (not shown) to sit upright when not in a horizontal position, and lower sections 244 have a height $H_2$ that enables the occupant's lower body to be positioned therein. The height $H_1$ of upper section 242 is greater than the height $H_2$ of lower section 244, and a height $H_3$ of third and ninth bunks 234 and 250 is greater than the height $H_2$ of lower section 244. As such, positioning lower sections 244 underneath third and ninth bunks 234 and 250 facilitates reducing a distance that overhead bunk assembly 216 protrudes into passenger cabin 208 (shown in FIG. 3) when compared to an assembly including bunks having a similar height $H_3$ as third and ninth bunks 234 and 250 stacked on top of each other (i.e., $H_1 < 2*H_3$). Moreover, the dimensions of third and ninth bunks 234 and 250 are selected to ensure top edges 252 of third and ninth bunks 234 and 250 are substantially flush with a top edge 254 of a remainder of overhead bunk assembly 216. For example, in one implementation, height $H_3$ is substantially equal to a difference in heights $H_1$ and $H_2$ (i.e., $H_3 = H_1 - H_2$).

Staggering the bunks in overhead bunk assembly 216 also facilitates reducing a distance that overhead bunk assembly 216 extends along a length of aircraft fuselage 200. For example, in the exemplary implementation, bunks 226, 228, and 246 each have a length $L_1$ such that an overall length $L_O$ of overhead bunk assembly 216 is substantially equal to three times length $L_1$. As described above, overhead bunk assembly 216 is designed to provide nine bunks for the crew of aircraft 102. When compared to an assembly designed to provide ten bunks, including five bunks coupled end-to-end on either side of an aisle, staggering bunks in overhead bunk assembly 216 facilitates reducing length $L_O$ by a distance of about two times length $L_1$. For example, a length $L_2$ of lower sections 244 are about one-half of length $L_1$ such that third bunk 234 having length $L_1$ is positionable between upper sections 242 of bunks 226 and 228 when stacked thereupon. As such, staggering bunks 226, 228, and 234 enables three bunks to be located along the length of aircraft fuselage 200 substantially equal to two bunks coupled end-to-end.

Figure 6:
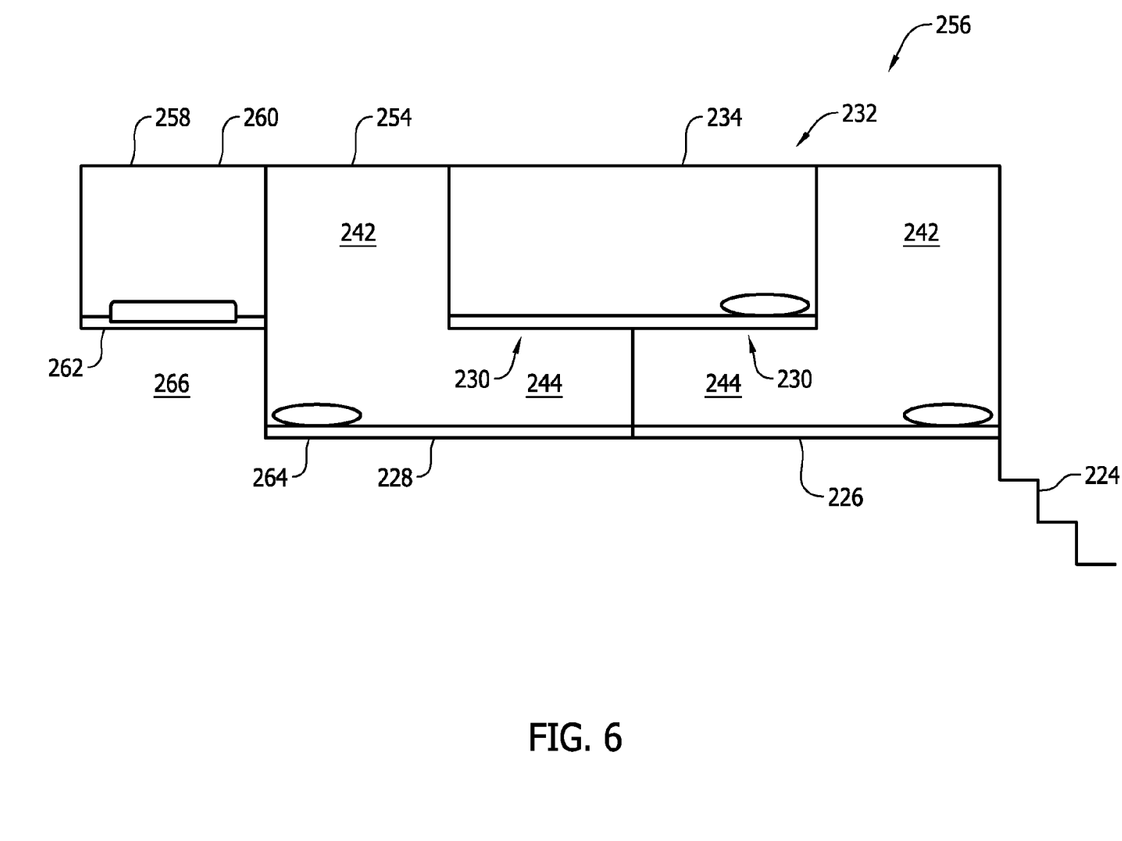
FIG. 6 is a schematic side view illustration of an alternative overhead bunk assembly that may be used with the aircraft fuselage shown in FIG. 3.
Figure 7:
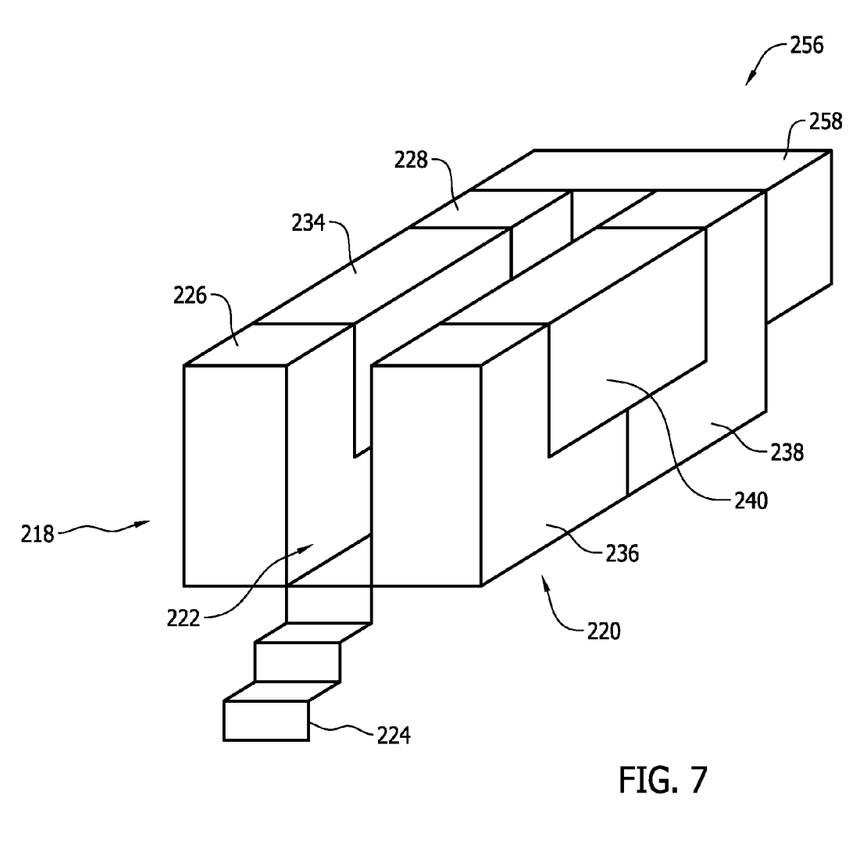
FIG. 7 is a perspective illustration of the overhead bunk assembly shown in FIG. 6.

FIG. 6 is a schematic side view illustration of an alternative overhead bunk assembly 256 that may be used with aircraft fuselage 200 (shown in FIG. 3), and FIG. 7 is a perspective illustration of overhead bunk assembly 256. In the exemplary implementation, overhead bunk assembly 256 is designed to provide seven bunks for the crew of aircraft 102. Specifically, overhead bunk assembly 256 includes bunks 226, 228, 234, and 236-240 staggered in a substantially similar arrangement as that in overhead bunk assembly 216. Moreover, overhead bunk assembly 256 includes an alternative seventh bunk 258 coupled to second and fifth bunks 228 and 238, and extending transversely relative to aisle 222. Seventh bunk 258 is coupled adjacent to upper sections 242 of second and fifth bunks 228 and 238 such that a top edge 260 of seventh bunk 258 is substantially flush with a top edge 254 of a remainder of overhead bunk assembly 256, and such that a bottom edge 262 of seventh bunk 258 extends into passenger cabin 208 (shown in FIG. 3) by a shorter distance than a bottom edge 264 of a remainder of overhead bunk assembly 256. As such, a void space 266 is defined below seventh bunk 258, which may then be utilized to provide additional overhead storage capacity, for example.

A method of manufacturing a bunk assembly, such as bunk assemblies 216 and 256, is also provided herein. The method includes coupling first bunk 226 end-to-end with second bunk 228, wherein the first and second bunks 226 and 228 each include cutout 230 that substantially align forming bunk slot 232 between first and second bunks 226 and 228. The method also includes positioning third bunk 234 in bunk slot 232 such that third bunk 234 is stacked on top of first and second bunks 226 and 228. In one implementation, the method includes defining upper sections 242 and lower sections 244 in first and second bunks 226 and 228 with cutout 230, wherein lower sections 244 have a shorter height than upper sections 242 and third bunk 234.

In some implementations, the method includes coupling a fourth bunk, such as seventh bunk 246, end-to-end with second bunk 228, wherein the fourth bunk includes cutout 230 defining upper section 242 and lower section 244 in the fourth bunk. A fifth bunk, such as ninth bunk 250, is then coupled to the fourth bunk such that the fifth bunk is stacked on top of lower section 244 of the fourth bunk. Coupling the fifth bunk includes extending the fifth bunk transversely relative to the fourth bunk. Moreover, in one implementation, the method includes coupling a sixth bunk, such as seventh bunk 258, to the second bunk, wherein the sixth bunk extends transversely relative to the second bunk. Coupling the sixth bunk includes substantially aligning top edge 260 of the sixth bunk with top edge 254 of a remainder of bunk assembly 256.

The implementations described herein relate to a space-saving arrangement of bunks in an overhead bunk assembly in an aircraft. A shape of at least some of the bunks are reconfigured such that other standard-shaped bunks can be stacked thereupon. More specifically, space in the reconfigured bunks once allocated to receive an occupant's lower body has been re-allocated to a section of the bunk sized to receive an occupant's upper body. The re-allocation of space in the bunks enables bunks in the assembly to be arranged in an efficient and space-saving manner. As such, the bunk assemblies described herein facilitate reducing an overall weight of the aircraft, and facilitate increasing space in a passenger cabin of the aircraft that may be used for other purposes.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bunk assembly comprising:
   a first plurality of bunks comprising:
      a first bunk;
      a second bunk coupled end-to-end with said first bunk, wherein said first and second bunks each comprise a cutout that substantially align forming a bunk slot on top of a portion of said first and second bunks when coupled end-to-end; and
      a third bunk stacked on top of the portion of said first and second bunks when positioned in said bunk slot formed by the cutouts, wherein said third bunk comprises a height such that a top edge of said third bunk is substantially flush with a top edge of said first and second bunks.

2. The assembly in accordance with claim 1, wherein each said cutout defines an upper section and a lower section in said first and second bunks, said lower section having a shorter height than said upper section and said third bunk.

3. The assembly in accordance with claim 1 further comprising:
   a second plurality of bunks extending substantially parallel with said first plurality of bunks, said second plurality of bunks comprising:
      a fourth bunk;
      a fifth bunk coupled end-to-end with said fourth bunk, wherein said fourth and fifth bunks each comprise a cutout that substantially align forming a bunk slot on top of a portion of said fourth and fifth bunks when coupled end-to-end; and
      a sixth bunk stacked on top of the portion of said fourth and fifth bunks when positioned in said bunk slot formed by the cutouts, wherein said sixth bunk comprises a height such that a top edge of said sixth bunk is substantially flush with a top edge of said fourth and fifth bunks; and
   an aisle separating said first and second pluralities of bunks.

4. The assembly in accordance with claim 3 further comprising:
a seventh bunk coupled end-to-end with said second bunk of said first plurality of bunks;
an eighth bunk coupled end-to-end with said fifth bunk of said second plurality of bunks; and
a ninth bunk coupled to said seventh and eighth bunks and extending transversely relative to said aisle.

5. The assembly in accordance with claim 4, wherein said seventh and eighth bunks each comprise a cutout such that said ninth bunk is stacked on top of a portion of said seventh and eighth bunks formed by the cutouts, wherein said ninth bunk comprises a height such that a top edge of said ninth bunk is substantially flush with a top edge of said seventh and eighth bunks when extending transversely relative to said aisle.

6. The assembly in accordance with claim 3 further comprising a seventh bunk coupled to a portion of said first and second pluralities of bunks, said seventh bunk extending transversely relative to said aisle.

7. An aircraft assembly comprising:
a fuselage comprising a passenger cabin; and
a bunk assembly within said passenger cabin, said bunk assembly comprising a first plurality of bunks that comprises:
a first bunk;
a second bunk coupled end-to-end with said first bunk, wherein said first and second bunks each comprise a cutout that substantially align forming a bunk slot on top of a portion of said first and second bunks; and a third bunk stacked on top of the portion of said first and second bunks when positioned in said bunk slot formed by the cutouts, wherein said third bunk comprises a height such that a top edge of said third bunk is substantially flush with a top edge of said first and second bunks.

8. The assembly in accordance with claim 7, wherein each said cutout defines an upper section and a lower section in said first and second bunks, said lower section having a shorter height than said upper section and said third bunk.

9. The assembly in accordance with claim 7, wherein said bunk assembly further comprises:
a second plurality of bunks extending substantially parallel with said first plurality of bunks, said second plurality of bunks comprising:
a fourth bunk;
a fifth bunk coupled end-to-end with said fourth bunk, wherein said fourth and fifth bunks each comprise a cutout that substantially align forming a bunk slot on top of a portion of said fourth and fifth bunks when coupled end-to-end; and
a sixth bunk stacked on top of the portion of said fourth and fifth bunks when positioned in said bunk slot formed by the cutouts, wherein said sixth bunk comprises a height such that a top edge of said sixth bunk is substantially flush with a top edge of said fourth and fifth bunks; and
an aisle separating said first and second pluralities of bunks.

10. The assembly in accordance with claim 9 further comprising:
a seventh bunk coupled end-to-end with said second bunk of said first plurality of bunks;
a an eighth bunk coupled end-to-end with said fifth bunk of said second plurality of bunks; and
a ninth bunk coupled to said seventh and eighth bunks and extending transversely relative to said aisle.

11. The assembly in accordance with claim 9 further comprising a seventh bunk coupled to a portion of said first and second pluralities of bunks, said seventh bunk extending transversely relative to said aisle.

12. The assembly in accordance with claim 11, wherein a bottom edge of said seventh bunk extends a shorter distance into said passenger cabin than a bottom edge of said first and second pluralities of bunks.

13. A method of manufacturing a bunk assembly, said method comprising:
coupling a first bunk end-to-end with a second bunk, wherein the first and second bunks each include a cutout that substantially align forming a bunk slot on top of a portion of the first and second bunks; and
positioning a third bunk in the bunk slot formed by the cutouts such that the third bunk is stacked on top of the portion of the first and second bunks, wherein the third bunk comprises a height such that a top edge of the third bunk is substantially flush with a top edge of the first and second bunks.

14. The method in accordance with claim 13 further comprising defining an upper section and a lower section in the first and second bunks with the cutout, wherein the lower section has a shorter height than the upper section and the third bunk.

15. The method in accordance with claim 13 further comprising:
coupling a fourth bunk end-to-end with the second bunk, wherein the fourth bunk includes a cutout defining an upper section and a lower section in the fourth bunk and forming a bunk slot adjacent the upper section and on top of the lower section; and
coupling a fifth bunk to the fourth bunk such that the fifth bunk is stacked on top of the lower section of the fourth bunk formed by the cutout, wherein the fifth bunk comprises a height such that a top edge of said fifth bunk is substantially flush with a top edge of the fourth bunk.

16. The method in accordance with claim 15, wherein coupling the fifth bunk comprises extending the fifth bunk transversely relative to the fourth bunk.

17. The method in accordance with claim 13 further comprising coupling a fourth bunk to the second bunk, wherein the fourth bunk extends transversely relative to the second bunk.

18. The method in accordance with claim 17, wherein coupling the fourth bunk comprises substantially aligning a top edge of the fourth bunk with a top edge of a remainder of the bunk assembly.

* * * * *